United States Patent
Akashi et al.

(10) Patent No.: US 8,632,303 B2
(45) Date of Patent: Jan. 21, 2014

(54) WIND TURBINE GENERATOR

(75) Inventors: Yu Akashi, Tokyo (JP); Takeshi Matsuo, Tokyo (JP); Shinsuke Sato, Tokyo (JP); Takuro Kameda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/291,662

(22) Filed: Nov. 8, 2011

(65) Prior Publication Data

US 2012/0148407 A1    Jun. 14, 2012

Related U.S. Application Data

(63) Continuation of application No. PCT/JP2011/068283, filed on Aug. 10, 2011.

(51) Int. Cl.
*F03D 1/04* (2006.01)
(52) U.S. Cl.
USPC ............................. 415/176; 415/108; 415/178
(58) Field of Classification Search
USPC ................. 415/108, 114, 175, 176, 177, 178; 417/423.8
See application file for complete search history.

(56) References Cited

U.S. PATENT DOCUMENTS

| | | | |
|---|---|---|---|
| 7,168,251 B1 * | 1/2007 | Janssen | 60/641.1 |
| 7,427,814 B2 * | 9/2008 | Bagepalli et al. | 290/55 |
| 7,843,080 B2 * | 11/2010 | Jansen | 290/55 |
| 8,047,774 B2 * | 11/2011 | Bagepalli | 415/176 |
| 2002/0117291 A1 | 8/2002 | Cheon | |
| 2003/0178176 A1 | 9/2003 | Jenkins et al. | |
| 2005/0174735 A1 | 8/2005 | Mankaruse et al. | |
| 2007/0002538 A1 | 1/2007 | Tomioka | |
| 2010/0032959 A1 * | 2/2010 | Nies | 290/55 |

(Continued)

FOREIGN PATENT DOCUMENTS

| | | |
|---|---|---|
| DE | 2138376 | 2/1973 |
| EP | 1798414 | 6/2007 |

(Continued)

OTHER PUBLICATIONS

Print-out of DERWENT abstract for JP2008255922A.*

(Continued)

*Primary Examiner* — Edward Look
*Assistant Examiner* — Christopher R Legendre
(74) *Attorney, Agent, or Firm* — Manabu Kanesaka; Kenneth M. Berner; Benjamin J. Hauptman

(57) ABSTRACT

A wind turbine generator includes a tower, at least one blade, a hub supporting the blade, a nacelle supported by the tower and having a duct part with an intake port and an exhaust port, and a heat exchanger provided in the duct part and cooling a cooling medium for a heat-producing component inside the tower or nacelle. The wall of the nacelle has a double wall structure constituted of an inner wall and an outer wall in an area where the duct part is provided. The inner wall forms a bottom surface of the duct part and has a curved portion which curves inward toward a center line of the nacelle with increasing distance from the hub. The duct part increases in cross-section from a side of the intake port to a side of the exhaust port at least in an area where the curved portion is formed.

16 Claims, 9 Drawing Sheets

(56) References Cited

U.S. PATENT DOCUMENTS

| | | | |
|---|---|---|---|
| 2010/0061853 A1* | 3/2010 | Bagepalli | 416/95 |
| 2010/0066088 A1 | 3/2010 | Matsushita | |
| 2010/0127502 A1 | 5/2010 | Uchino et al. | |
| 2010/0164228 A1* | 7/2010 | Matsuo et al. | 290/52 |
| 2011/0204652 A1* | 8/2011 | Sato et al. | 290/1 B |
| 2011/0221204 A1* | 9/2011 | Kim et al. | 290/55 |
| 2011/0272949 A1* | 11/2011 | Matsuo et al. | 290/55 |
| 2012/0001437 A1* | 1/2012 | Matsuo et al. | 290/55 |
| 2012/0001438 A1* | 1/2012 | Matsuo et al. | 290/55 |
| 2012/0124984 A1* | 5/2012 | Akashi et al. | 60/398 |
| 2012/0148407 A1* | 6/2012 | Akashi et al. | 416/95 |

FOREIGN PATENT DOCUMENTS

| | | | |
|---|---|---|---|
| EP | 2007184 | | 12/2008 |
| JP | 58-047181 | | 3/1983 |
| JP | 2003-083635 | | 3/2003 |
| JP | 2003-343417 | A | 12/2003 |
| JP | 2008255922 | A * | 10/2008 |
| JP | 2008286115 | | 11/2008 |
| JP | 2009-091929 | A | 4/2009 |
| JP | 2009-138555 | A | 6/2009 |
| JP | 2009-185641 | | 8/2009 |
| JP | 2009185641 | A * | 8/2009 |
| JP | 2010-007649 | | 1/2010 |
| JP | 2010-31722 | | 2/2010 |
| WO | WO 2011/074395 | | 6/2011 |

OTHER PUBLICATIONS

Print-out of DERWENT abstract for JP2009185641A.*
PCT, "English translation of the International Search Report and Written Opinion of the International Searching Authority for PCT/JP2011/068283", Nov. 8, 2011.
PCT, "International Search Report and Written Opinion of the International Searching Authority for PCT/JP2012/054770", May 22, 2012.
Japan Patent Office, "Notice of Allowance for JP 2013-505002", May 13, 2013.
Japan Patent Office, "Decision to grant a patent for JP2012-503164," Nov. 18, 2013.

* cited by examiner

WIND TURBINE GENERATOR

RELATED APPLICATIONS

The present application is continuation from PCT International Application of PCT/JP2011/068283 filed Aug. 10, 2011, the disclosure of which is hereby incorporated by reference herein in its entirety.

TECHNICAL FIELD

The present invention relates to a wind turbine generator equipped having a function of cooling a heat-producing component in a tower and a nacelle. The heat-producing component includes a generator, a hydraulic transmission, a transformer, a converter, a control board and the like.

BACKGROUND ART

From the perspective of preserving the global environment, wind turbine generators using renewable energy, i.e. wind power, are becoming popular. To improve power generation efficiency, it is desired to increase the size of the wind turbine generator. Particularly, wind turbine generators installed offshore are expensive to construct in comparison to those installed onshore and thus, it is desired to improve power generation efficiency by increasing the size of the wind turbine generator so as to improve profitability.

With increased output of the generator produced by the larger wind turbine generator, heat loss from the generator increases. In the wind turbine generator in which the rotation of the rotor is transmitted to the generator by a hydraulic transmission formed by a hydraulic pump and a hydraulic motor, in addition to the heat loss from the generator, there is heat loss from the hydraulic transmission. Thus, a wind turbine generator having a function of cooling a heat-producing component such as the generator and the hydraulic transmission is desired.

In view of this, Patent Literature 1 proposes a wind turbine generator having a cooling system for cooling a converter, a transformer and a control unit. The cooling system includes a plurality of heat exchangers installed around a tower. In the heat exchangers, a cooling medium having cooled the converter, the transformer and the control unit is cooled by heat exchange with atmospheric air.

Patent Literature 2 discloses a cooling device for a wind turbine generator. The cooling device has a heat exchanger to cool a plurality of devices such as a converter, a transformer, a bearing box and a generator. Cooling water cools the devices and then is cooled by the heat exchanger installed on an outer wall of a tower and a nacelle.

In Patent Literature 3 and Patent Literature 4, disclosed are wind turbine generators in which an intake duct and an exhaust duct are formed in a nacelle for ventilating the nacelle which houses heat-producing components such as a gearbox and a generator. In such wind turbine generators, ambient air is introduced through the intake duct and exhausted from the exhaust duct so as to ventilate the nacelle, thereby preventing temperature rise in the nacelle.

CITATION LIST

Patent Literature

| [PTL1] | EP1798414A |
| [PTL2] | EP2007184A |
| [PTL3] | JP2008-286115A |
| [PTL4] | JP2010-031722A |

SUMMARY OF INVENTION

Technical Problem

With the increased size of the wind turbine generator, the amount of heat released from the heat-producing component tends to increase. Therefore, it is difficult to perform the cooling of the heat-producing component sufficient in the wind turbine generators disclosed in Patent Literatures 1 to 4.

In view of the above issues, it is an object of the present invention to provide a wind turbine generator being capable of effectively cooling the heat-producing component in the tower and the nacelle.

Solution to Problem

The present invention provides a wind turbine generator which may include, but is not limited to:
a tower;
at least one blade;
a hub which supports the blade;
a nacelle which is supported by the tower and has a duct part having an intake port and an exhaust port, the duct part being integrally-formed on a wall of the nacelle; and
a heat exchanger which is provided in the duct part and cools a cooling medium having cooled a heat-producing component inside at least one of the tower and the nacelle by heat exchange with an ambient air introduced into the duct part through the intake port. The wall of the nacelle may have a double wall structure constituted of an inner wall and an outer wall in an area where the duct part is provided, the inner wall of the nacelle may form a bottom surface of the duct part and have a curved portion which curves inward toward a center line of the nacelle with increasing distance from the hub, and the duct part may increase in cross-section from a side of the intake port to a side of the exhaust port at least in an area where the curved portion is formed.

Cooling of the heat-producing component by the cooling medium indicates that the cooling medium cools the heat-producing component directly or indirectly. This includes the case where the heat-producing component is cooled directly by heat exchange with the cooling medium and the case where the heat-producing component is indirectly cooled by another cooling medium provided between the heat-producing component and the cooling medium.

The center line of the nacelle indicates a straight line which is approximately horizontal along a direction from the hub side to the rear side of the nacelle and is drawn substantially through a center of the nacelle in a height direction and a width direction of the nacelle.

According to the above wind turbine generator, the inner wall of the nacelle forming the bottom surface of the duct part has the curved portion that curves inward toward the center line of the nacelle with the increasing distance from the hub. By this, outward protrusion of the duct part is suppressed while the cross-sectional area of the duct part is increased from the intake port side to the exhaust port side. By suppressing the outward protrusion of the duct part, the force of the wind (the flow of the ambient air) acting on the duct part decreases, thereby simplifying reinforcement of the duct part. With the increased cross-sectional area of the duct part from the intake port side to the exhaust port side, the intake amount of the ambient air into the duct part increases due to the diffuser effect. As a result, the amount of heat the ambient air receives from the cooling medium is increased, and thus, the heat-producing component can be cooled effectively.

The intake amount of the air to the duct part increases due to the diffuser effect for the following reason.

The ambient air flowing in the duct part is exhausted from the exhaust port after the speed is reduced sufficiently in a section where the cross-sectional area of the duct increases (diffuser section). This suppresses disturbed flow of the ambient air near the exhaust port, thereby improving the intake amount of the air in the duct part.

In the above wind turbine generator, more than one of the heat exchanger may be provided in the duct part which is integrally formed on a top surface and a side surface of the nacelle.

In this manner, by providing more than one of the heat exchanger in the duct part integrally formed on the top surface and the side surface of the nacelle, a surface area of the top surface and the side surface of the nacelle is utilized, allowing a significant amount of heat to be released from the heat-producing component effectively to the atmospheric air side. Further, by cooling the heating medium by more than one heat exchanger, each of the heat exchangers can be small in size. Thus, it is now possible to keep each of the heat exchangers near the center axis of the nacelle in the duct part, thereby improving a structural strength and minimize reinforcement.

In the above wind turbine generator, an end of the duct part which is on the side of the intake port may be formed along the center line of the nacelle.

The ambient air flows from the hub side to the rear side of the nacelle generally along the center line to promote the ambient air entering the duct part. Thus, the heat exchange amount in the heat exchanger increases and the heat-producing component can be cooled effectively.

The above wind turbine generator may further include, but is not limited to, a fan which allows a larger amount of the ambient air to enter the duct part and a casing which houses both of the fan and the heat exchanger and more than one module comprising the heat exchanger, the fan and the casing may be provided.

In this manner, by providing the fan which allows a larger amount of the ambient air to enter the duct part, the heat exchange amount in the heat exchanger further increases and the heat-producing component can be cooled effectively.

Further by using the module, each being formed by at least the fan, the heat exchanger and the casing housing the fan and the heat exchanger, it is possible to improve productivity and maintainability of the wind turbine generator (in particular, the cooling system of the heat-producing component). It is easier to assemble the wind turbine generator with use of the modules, thereby improving the productivity. When a part of the heat exchanger and the fan are broken, the part having a failure source is attended by replacing the module thereof and thus, maintenance is facilitated. Further, by changing the number of the modules depending on the amount of heat generation from the heat-producing component of the wind turbine generator, a variety of wind turbine generators with different amount of heat generation from the heat-producing component can be produced efficiently.

Herein, the module indicates a unit of communized parts. The modules has practically the same shape and structure. However, a slight difference including a manufacturing error may be allowed.

In the case of using the module, more than one module may be provided in the duct part which is integrally formed on a top surface and a side surface of the nacelle.

In this manner, by providing more than one of the module integrally formed on the top surface and the side surface of the nacelle, it is now possible to keep each of the modules near the center axis of the nacelle, thereby improving a structural strength and allowing a significant amount of heat to be released from the heat-producing component effectively to the atmospheric air side.

In the case of using the module, the wind turbine generator may further include a controller which changes a number of the fan that is in an operating status to adjust an amount of heat the ambient air receives from the cooling medium in the heat exchanger of each of the module.

Alternatively, the wind turbine generator may further include a shutter which is provided in the duct part, and a controller which controls opening and closing of the shutter to adjust an amount of heat the ambient air receives from the cooling medium in the heat exchanger of each of the module.

Or, the wind turbine generator may further include a controller which changes a rotation speed of the fan to adjust an amount of heat the ambient air receives from the cooling medium in the heat exchanger of each of the module.

In this manner, the number of the fan that is in an operating status, the opening and closing of the shutter or the rotation speed of the fan is controlled by the controller to adjust the amount of heat the ambient air receives from the cooling medium in the heat exchanger. Thus, it is possible to keep within an appropriate temperature the temperature of the cooling medium which is reused after exiting the heat exchanger to cool the heat-producing component so as to cool the heat-producing component to a moderate extent.

Particularly, in the wind turbine generator using the hydraulic transmission whose operating oil is cooled by the cooling medium, excessively low temperature of the cooling medium accelerate cooling of the operating oil and viscosity of the operation oil exceeds an upper limit thereof. When the viscosity of the operating oil exceeds the upper limit, loss of pressure in the hydraulic transmission increase, resulting in a significant drop in power generation efficiency. In view of this, the heat exchange amount is adjusted according to any of the above-described methods to keep the temperature of the cooling medium within the appropriate range. As a result, it is possible to suppress the loss of pressure in the hydraulic transmission due to the increased viscosity of the operation oil.

In the above wind turbine generator, the outer wall of the nacelle may constitute a top surface of the duct part and have a curved portion which curves along a bottom surface of the duct.

In this manner, the top surface of the duct part (the outer wall of the nacelle) may curve along the bottom surface of the duct part so as to maintain the diffuser effect with the increased cross-sectional dimension and simultaneously to prevent a vortex in the airflow outside the nacelle.

The wind turbine generator may further include:
a main shaft which is coupled to the hub;
a hydraulic pump which is driven by the main shaft;
a hydraulic motor which is driven by operating oil of high pressure that is supplied from the hydraulic pump;
a generator which is connected to the hydraulic motor;
an oil line which is connected to the hydraulic pump and the hydraulic motor to circulate the operating oil between the hydraulic pump and the hydraulic motor;
an oil cooler which cools the operating oil flowing in the oil line; and
a generator cooler which cools the generator and the cooling medium having been cooled in the heat exchanger may be supplied to the oil cooler and the generator cooler.

In the case of the wind turbine generator equipped with the hydraulic transmission formed by the hydraulic pump and the hydraulic motor, the main heat-producing component is the hydraulic transmission (the operating oil circulating in the oil line) and the generator. Thus, the heat generated from the heat-producing component can be effectively removed by supplying the cooling medium cooled in the heat exchanger to the oil cooler and the generator cooler.

As described above, in the case of supplying the cooling medium to the oil cooler and the generator cooler in the wind turbine generator equipped with the hydraulic transmission, the wind turbine generator may further include a nacelle cooler which is provided in the nacelle and cools an air in the nacelle and the cooling medium having been cooled in the heat exchanger may be supplied to the nacelle cooler.

By this, the heat generated from the operating oil circulating in the oil line and the generator is removed and at the same time the air in the nacelle is effectively cooled.

Further, in the case of supplying the cooling medium to the oil cooler, the generator cooler and the nacelle cooler in the wind turbine generator equipped with the hydraulic transmission, the wind turbine generator may further include a controller which adjusts a heat exchange amount in at least one of the oil cooler, the generator cooler, the nacelle cooler and the heat exchanger based on at least one of a temperature of the operating oil in the oil line, a temperature of the generator, a temperature of the air in the nacelle and a temperature of the cooling medium.

The heat exchange amount in the oil cooler, the generator cooler, the nacelle cooler, the heat exchanger cooler and the like is adjusted so as to control the temperature of the operating oil, the temperature of the generator, the temperature of the air in the nacelle, the temperature of the cooling medium and the like.

Alternatively, the wind turbine generator may further include:
a fan which allows a larger amount of the ambient air to enter the duct part;
a casing which houses both of the fan and the heat exchanger; and
a controller which controls the fan and the heat exchanger of each of modules based on at least one of a temperature of the operating oil in the oil line, a temperature of the generator, a temperature of the air in the nacelle and a temperature of the cooling medium, said each of the modules comprising the casing, the heat exchanger and the fan.

By controlling the fan and the heat exchanger of each of the modules, e.g. controlling the number of operating fans, the rotation speed of the fan, the flow rate of the cooling medium in the heat exchanger), it is possible to adjust the temperature of the operating oil, the temperature of the generator, the temperature of the air in the nacelle, the temperature of the cooling medium and so on.

In the above wind turbine generator, the cooling medium may be one of water to which antifreeze fluid is added and an air.

With use of water having larger specific heat than common gas such as air as the cooling medium, a required amount of the cooling medium circulating is reduced and the cooling system can be downsized. Further, by adding antifreeze, the cooling medium (water) does not freeze even when an ambient temperature is below freezing, thereby preventing a failure of the cooling system.

With use of the air as the cooling medium, the cooling medium can be easily handled and be obtained in a regular environment.

In the above wind turbine generator, the outer wall of the nacelle may constitute a top surface of the duct part and bend or curve outward in a direction away from the centerline of the nacelle.

By bending or curving the outer wall of the nacelle on the exhaust port side outward, in addition to the diffuser effect, the intake amount of the ambient air increases for the following reason.

Specifically, with reduced flow passage area where the outer wall of the nacelle bends or curves outward, the air flowing along the outer wall of the nacelle outside of the duct part increases the speed, raising the dynamic pressure. For the corresponding amount, the static pressure decreases. Therefore, the pressure (static pressure) decreases on a downstream side of the area where the outer wall of the nacelle bends or curves outward. Further in the case where the outer wall of the nacelle bends or curves outward discontinuously, this generates a vortex on the downstream side of the curved or bended portion. This also contributes to the pressure drop in the area. Therefore, in addition to the diffuser effect, it is possible to draw in a larger amount of the ambient air at a low pressure to the duct part in the area on the downstream side of the bended or curved portion.

Advantageous Effects of Invention

According to present invention, the inner wall of the nacelle forming the bottom surface of the duct part has the curved portion that curves inward toward the centerline of the nacelle with the increasing distance from the hub. By this, outward protrusion of the duct part is suppressed while the cross-sectional area of the duct part is increased from the intake port side to the exhaust port side. By suppressing the outward protrusion of the duct part, the force of the wind (the flow of the ambient air) acting on the duct part decreases, thereby simplifying reinforcement of the duct part. With the increased cross-sectional area of the duct part from the intake port side to the exhaust port side, the intake amount of the ambient air into the duct part increases due to the diffuser effect. As a result, the amount of heat the ambient air receives from the cooling medium is increased, and thus, the heat-producing component can be cooled effectively.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First Preferred Embodiment

Figure 1:
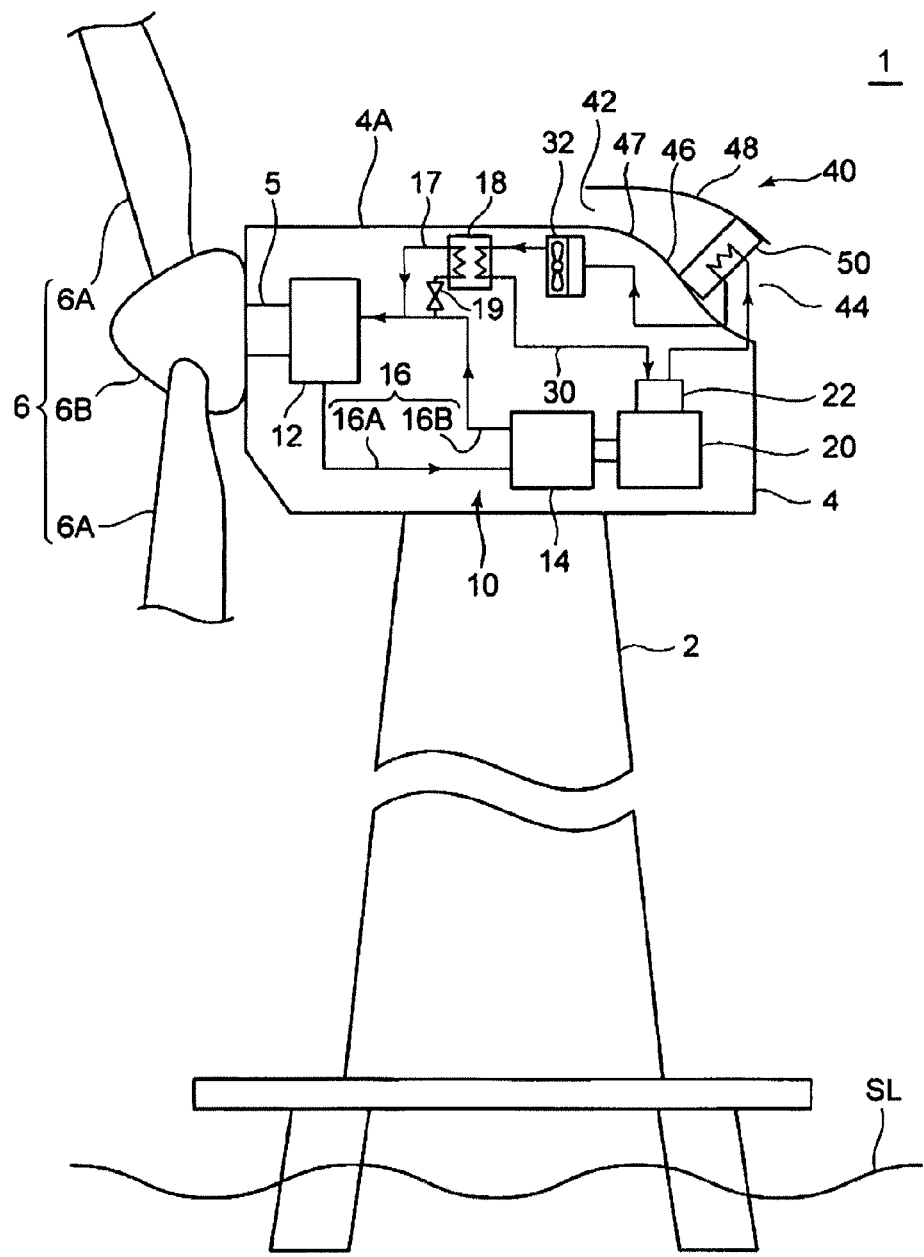
FIG. 1 shows an overall structure of a wind turbine generator in relation to a first preferred embodiment.

FIG. 1 shows an overall structure of a wind turbine generator in relation to a first preferred embodiment. FIG. 1 shows a wind turbine generator 1 which mainly includes a tower 2, a nacelle 4 supported to the tower 2 and a rotor 6 which rotates by wind power.

FIG. 1 shows the wind turbine generator 1 of an offshore type installed at the seal level (SL). However, the wind turbine generator 1 may be installed on shore.

The rotor 6 is formed by at least one blade 6A, e.g. three blades, and a hub 6B which supports the blade 6A. The hub 6B is connected to a main shaft 5 housed in the nacelle 4. By this, the wind acting on the blade 6A rotates the rotor 6, thereby rotating the main shaft 5 which is connected to the hub 6B.

A hydraulic transmission 10 and a generator 20 are housed in the nacelle 4. The hydraulic transmission 10 includes a hydraulic pump 12 connected to the main shaft 5, a hydraulic motor 14 connected to the generator 20 and an oil line 16 arranged between the hydraulic pump 12 and the hydraulic motor 14. The oil line 16 is constituted of a high-pressure oil line 16A connecting an exhaust side of the hydraulic pump 12 and an inlet side of the hydraulic motor 14, and a low-pressure oil line 16B connecting an inlet side of the hydraulic pump 12 and an exhaust side of the hydraulic motor 14.

The hydraulic pump 12 is driven by the main shaft 5 to produce operating oil of high pressure. The high-pressure operating oil is supplied to the hydraulic motor 14 via the high-pressure oil line 16A and then the hydraulic motor 14 is driven by the high-pressure operating oil. Meanwhile, the generator 20 connected to the hydraulic motor 14 is driven to produce electric power in the generator 20. The operating oil ejected from the hydraulic motor 14 is supplied to the hydraulic pump 12 via the low-pressure oil line 16B and then a pressure of the operating oil is increased in the hydraulic pump 12 and the operating oil is fed to the hydraulic motor 14.

An oil cooler 18 which cools the operating oil is connected in parallel to the low-pressure oil line 16B. Specifically, the oil cooler 18 is provided in a parallel line 17 diverging from and merging into the low-pressure oil line 16B. In the oil cooler 18, the operating oil streaming in the parallel line 17 is cooled by heat exchange with a cooling medium streaming in a cooling-medium circulating path 30. A detailed construction of the cooling-medium circulating path 30 is described later. Further, an amount of the operating oil streaming in the parallel line 17 is adjustable by changing an opening degree of a valve to keep a temperature of the operating oil within an appropriate range.

In the generator 20, a generator cooler 22 is provided to cool the generator 20. The generator cooler 22 may be constituted, for instance, as a cooling jacket provided around the generator 20. The generator cooler 22 cools the generator 20 by heat exchange with the cooling medium supplied from the cooling-medium circulating path 30 that is described later.

The cooling-medium circulating path 30 is a path which circulates the cooling medium to cool a heat-producing component of the wind turbine generator 1. In the preferred embodiment, the hydraulic transmission 10 and the generator 20 housed in the nacelle 4 are used as an example of the heat-producing component of the wind turbine generator 1.

The cooling medium circulating in the cooling-medium circulating path 30 may be a cooling medium made of any liquid or gas. For instance, water or air to which antifreeze is added may be used as the cooling medium. With use of water having larger specific heat than common gas such as air as the cooling medium, a required amount of the cooling medium circulating in the cooling-medium circulating path 30 is reduced. Further, by adding antifreeze, the cooling medium (water) does not freeze even when an ambient temperature is below freezing, thereby preventing a failure of the cooling system.

The cooling-medium circulating path 30 supplies the cooling medium to the oil cooler 18 and the generator cooler 22. The cooling-medium circulating path 30 is configured as a cooling-medium circuit of a closed loop and housed in the nacelle 4. In addition to the oil cooler 18 and the generator cooler 22, a nacelle cooler 32 for cooling inside of the nacelle 4 is provided in the cooling-medium circulating path 30.

The nacelle cooler 32 is configured as a heat exchanger equipped with a fan and a group of heat exchanger tubes. In the nacelle cooler 32, the air drawn in or forced in the nacelle 4 by means of the fan is cooled by heat exchange with the cooling medium supplied to the group of heat exchanger tubes from the cooling-medium circulating path 30. Thus, it is possible to effectively cool the air inside the nacelle 4 having been heated by released heat from the heat-producing component of the wind turbine generator 1.

On a downstream side of the oil cooler 18 and the generator cooler 22 in the cooling-medium circulating path 30, a heat exchanger 50 having a group of heat exchanger tubes is provided. The heat exchanger 50 is arranged inside the duct part of the nacelle 4. In the heat exchanger 50, the cooling medium having passed through the oil cooler 18 and the generator cooler 22 is cooled by heat exchange with the ambient air flowing in the duct part 40 of the nacelle 4.

Figure 4A:
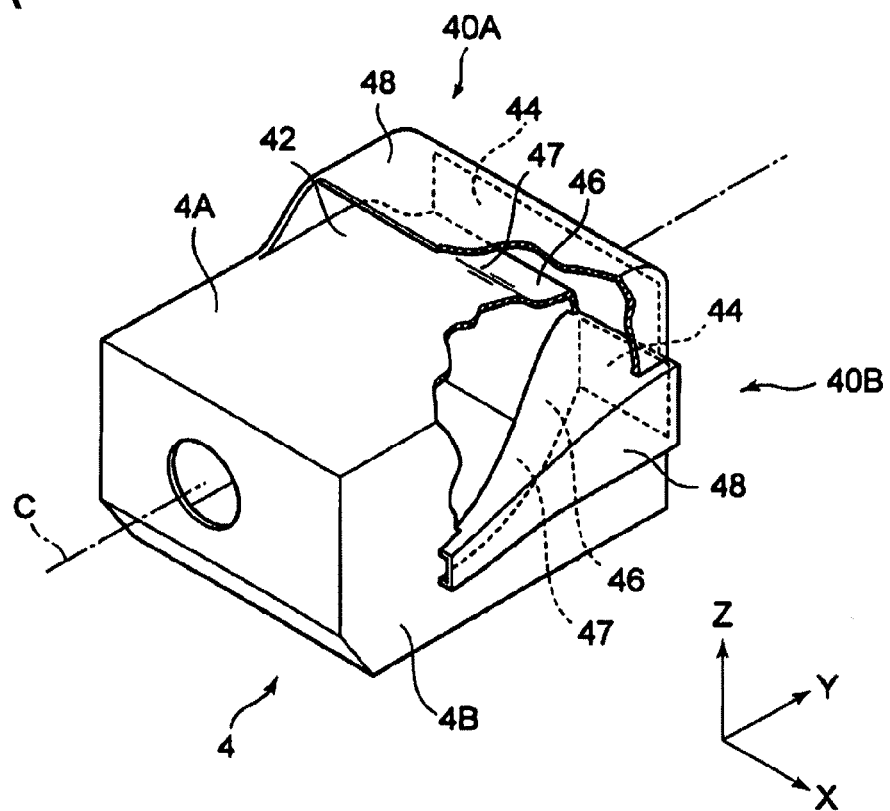
FIG. 4A is a fragmentary sectional view of an exemplary structure of a nacelle to show a detailed structure of a duct part of a nacelle.
Figure 4B:
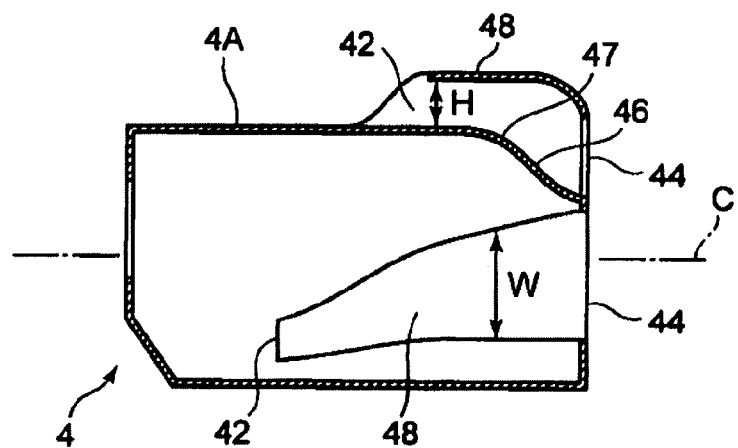
FIG. 4B is a cross-sectional view of the nacelle taken along X-Y plane of FIG. 4A.

FIG. 1 shows only one set of the duct part 40 and the heat exchanger 50. However this is not limitative and more than one set of the duct part 40 and the heat exchanger 50 may be provided depending on an expected amount of heat generation from the heat-producing component of the wind turbine generator 1. For instance, as shown in FIG. 4A and FIG. 4B that are described later, the heat exchanger 50 may be provided in each of the duct parts 40A and 40B formed respectively on a top surface 4A and a side surface 4B of the nacelle 4. Further, the number of heat exchangers 50 with respect to one duct part 40 is not limited. For instance, more than one heat exchanger 50 may be provided in each duct part 40.

Figure 2:
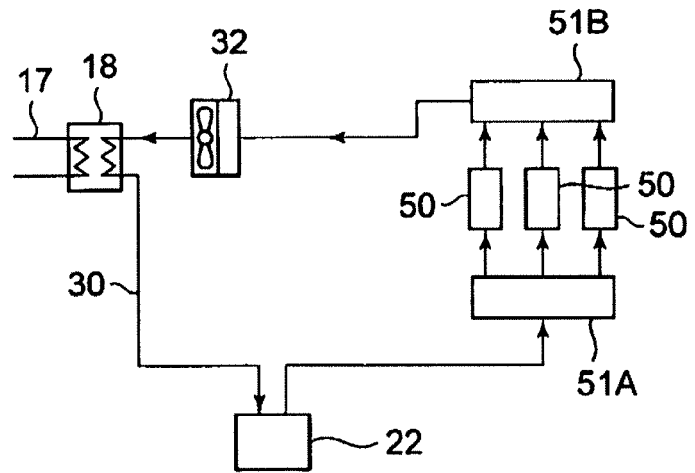
FIG. 2 shows an exemplary structure of a cooling-medium circulating path in which a plurality of heat exchangers are provided to cool a cooling medium.
Figure 3:
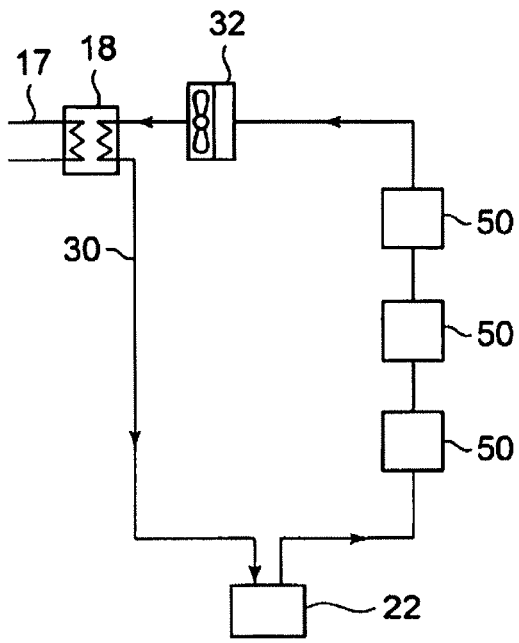
FIG. 3 shows another exemplary structure of a cooling-medium circulating path in which a plurality of heat exchangers are provided to cool a cooling medium.

FIG. 2 and FIG. 3 illustrate exemplary structures of the cooling-medium circulating path 30 in which a plurality of heat exchangers 50 are provided.

In the case of providing a plurality of heat exchangers 50, the heat exchangers 50 may be connected to the cooling-medium circulating path 30 via headers 51A and 51B as shown in FIG. 2 or may be serially connected to the cooling-medium circulating path 30 as shown in FIG. 3. In the first case (see FIG. 2), the cooling medium introduced into the inlet-side header 51A from the cooling-medium circulating path 30 is supplied to each of the heat exchangers 50 to be cooled and then is returned to the cooling-medium circulating path 30 via the exhaust-side header 51B. In the second case (see FIG. 3), the cooling medium streaming in the cooling-medium circulating path 30 is cooled while streaming through the serially-connected heat exchangers 50.

A structure of the duct part 40 of the nacelle 4 is explained in reference to FIG. 4. FIG. 4A is a fragmentary sectional view of an exemplary structure of the nacelle 4 to show a detailed structure of the duct part 40. FIG. 4B is a cross-sectional view of the nacelle 4 taken along X-Y plane of FIG. 4A.

For the purpose of facilitating the explanation of a detailed structure of the duct part 40, FIG. 4A and FIG. 4B depict a state where the heat exchanger 50 is removed.

As shown in FIG. 4A and FIG. 4B, the duct parts 40A and 40B are provided respectively on the top surface 4A and the side surface 4B of the nacelle 4. FIG. 4 shows the case where the duct part 40B is formed on one of the side surfaces 4B. It is also possible to form the duct parts 40B on both side surfaces 4B of the nacelle 4.

Each duct part 40 has an intake port 42 and an exhaust port 44 and is integrally-formed on a wall of the nacelle 4. Specifically, the wall of the nacelle 4 has a double wall structure constituted of an inner wall 46 and an outer wall 48 in an area where the duct part 40 is provided. Further, the inner wall 46 of the nacelle 4 forms a bottom surface of the duct part 40 and the outer wall 48 of the nacelle 4 forms a top surface of the duct part 40. The bottom surface of the duct part 40 is one of the walls 46, 48 forming the duct part 40a that is closer to a center line C of the nacelle 4, whereas the top surface of the duct part 40 is another of the walls 46, 48 that is farther from the center line C of the nacelle 4.

Hereinafter, the inner wall of the nacelle 4 and the bottom surface of the duct part 40 are indicated by the same reference number, 46 and the outer wall of the nacelle 4 and the top surface of the duct part 40 are indicated by the same reference number, 48.

The bottom surface 46 of each duct part 40 (the inner wall 46 of the nacelle 4) has a curved portion 47 which curves inward toward the center line C with increasing distance from the hub 6B. The duct part 40 has a height H which is a distance between the bottom surface 46 and the top surface 48 of the duct part 40. The height H of the duct part 40 increases gradually from a side of the intake port 42 to a side of the exhaust port 44 in an area where the curved portion 47 is formed. By this, outward protrusion of the top surface 48 of the duct part 40 (outward protrusion of the top surface 48 in a direction away from the center line C) is suppressed and a cross-sectional area of the duct part 40 is increased from the side of the intake port 42 to the side of the exhaust port 44. Therefore, the force of wind acting on the duct part 40 is reduced, thereby simplifying reinforcement of the duct part 40. In addition, the intake amount of the ambient air into the duct part 40 is increased due to diffuser effect, thereby improving the amount of heat the ambient air receives from the cooling medium in the heat exchanger 50.

The height H of the duct part 40 is a distance between the bottom surface 46 and the top surface 48 of the duct part 40. Specifically, as for the duct part 40A formed on the top surface 4A of the nacelle 4, the height H is a dimension of the duct part 40A in the direction indicated by Z in FIG. 4A and as for the duct part 40B formed on the side surface 4B of the nacelle 4, the height H is a dimension of the duct part 40A in the direction indicated by X in FIG. 4A.

In addition to the height H of the duct part 40, the width W of the duct part 40 may be increased gradually from the side of the intake port 42 to the side of the exhaust port 44. By this, the cross-sectional area of the duct part 40 is further enhanced. FIG. 4A and FIG. 4B depict a state where the width W of the duct part 40B formed on the side surface 4B of the nacelle increases gradually from the side of the intake port 42 to the side of the exhaust port 44.

The width W of the duct part 40 is a dimension of the duct part 40 in a direction orthogonal to the direction of the height of the duct part 40. Specifically, as for the duct part 40A formed on the top surface 4A of the nacelle 4, the width W of the duct part 40 is a dimension of the duct part 40A in the direction of X in FIG. 4A and as for the duct part 40B formed on the side surface 4B of the nacelle 4, the width W is a dimension of the duct part 40B in the direction of Z in FIG. 4A.

The intake port 42 of the duct part 40 is preferably arranged on a rear side (a side farther away from the hub 6B) of a center position of the nacelle 4 in a longitudinal direction of the nacelle 4, i.e. the direction of the center line C. By this, without being affected by a turbulence of the airflow (flow of the ambient air) generated when passing through the blade 6A, it is possible to draw in the ambient air into the duct part 40 in a stable manner. FIG. 4A and FIG. 4B depict an exemplary case where the intake port 42 of the duct part 40A formed on the top surface 4A is arranged on the rear side (the side farther away from the hub 6B) of the center position of the nacelle 5 in the longitudinal direction.

An end of the duct part 42 which is on the side of the intake port 42 is formed along the center line C of the nacelle 4. Specifically, as for the duct part 40A is formed on the top surface 4A of the nacelle 4, the end of the duct part 40A on the side of the intake port 42 is formed approximately parallel to the X-Y plane along the center line C of the nacelle 4. As for the duct part 40B formed on the side surface 4B of the nacelle 4, the end of the duct part 40B on the side of the intake port 42 is formed approximately parallel to the Y-Z plane along the center line C of the nacelle C. The ambient air flows from the hub side to the rear side of the nacelle 4 generally along the center line C to promote the ambient air entering the duct part 40.

As shown in FIG. 4A and FIG. 4B, the top surface 48 of the duct part 40 (the outer wall 48 of the nacelle 4) may curve along the bottom surface 46 of the duct part 40. In this manner, the top surface 48 of the duct part 40 is formed along the bottom surface 46 of the duct part 40 so as to maintain the diffuser effect with the increased cross-sectional dimension and simultaneously to prevent a vortex in the air flow outside the nacelle.

As described above, in the preferred embodiment, the bottom surface 46 of the duct part 40A, 40B (the inner wall 46 of the nacelle 4) has the curved portion 47 that curves inward toward the center line C of the nacelle 4 with the increasing distance from the hub 6B. By this, outward protrusion of the duct part 40A, 40B is suppressed while the cross-sectional area of the duct part 40A, 40B is increased from the side of the intake port 42 to the side of the exhaust port 44. By suppressing the outward protrusion of the duct part 40A, 40B, the force of the wind (the flow of the ambient air) acting on the duct part 40A, 40B decreases, thereby simplifying reinforcement of the duct part 40A, 40B. With the increased cross-sectional area of the duct part 40A, 40B from the side of the intake port 42 to the side of the exhaust port 44, the intake amount of the ambient air into the duct part 40A, 40B increases due to the diffuser effect. As a result, the amount of heat the ambient air receives from the cooling medium increase, and thus, the heat-producing component (the hydraulic transmission 10 and the generator 20) can be cooled effectively.

In the first preferred embodiment, the hydraulic transmission 10 and the generator 20 housed in the nacelle 4 are cooled by the cooling medium flowing in the cooling-medium circulating path. However, this is not limitative and at least part of the hydraulic transmission 10 and the generator 20 may be housed in the tower 2. For instance, the hydraulic pump 12 may be provided in the nacelle 4 while the hydraulic motor 14 and the generator 20 connected to the hydraulic motor 14 may be housed in the tower 2, the operating oil flowing in the oil line 16 and the generator 20 being cooled by the cooling medium flowing in the cooling-medium circulating path 30 extending to the tower 2.

The heat-producing component to be cooled by the cooling medium in the cooling-medium circulating path 30 is not limited to the hydraulic transmission 10 and the generator 20. The heat-producing component may be any heat-producing component such as lubricating oil for a main bearing supporting the main shaft 5 rotatably to the side of the nacelle 4, a transformer and a converter provided between the generator and a power grid, and a control board formed by a variety of devices controlling each component of the wind turbine generator 1. In the case of a wind turbine generator transmitting the rotation of the main shaft 5 to the generator 20 via a gearbox, lubricating oil of the gearbox may be cooled by the cooling medium in the cooling-medium circulating path 30 instead of the hydraulic transmission 10.

Second Preferred Embodiment

A wind turbine generator in relation to a second preferred embodiment is explained. The wind turbine generator of the second preferred embodiment has the same structure as the wind turbine generator 1 of the first preferred embodiment except for a fan additionally provided in the duct part 40 of the nacelle 4. Thus, the components that are already explained in the first preferred embodiment are indicated by the same reference numbers and are not explained further and mainly the structure different from the first preferred embodiment is explained here.

Figure 5:
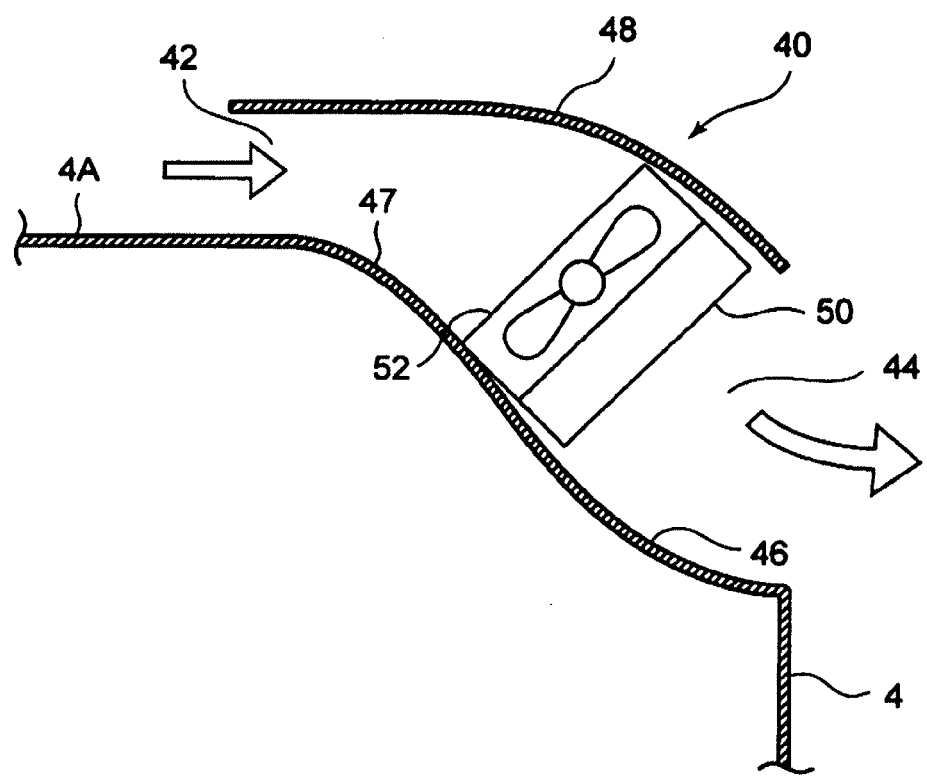
FIG. 5 shows a structure around a duct part of a wind turbine generator in relation to a second preferred embodiment.

FIG. 5 shows a structure around the duct part 40 of the wind turbine generator in relation to the second preferred embodiment. FIG. 5 shows a fan 52 provided in the duct part 40 of the nacelle 4 in addition to the heat exchanger 50. By providing the fan 52 in the duct part 40, the intake amount of the ambient air into the duct part 40 is increased, thereby increasing the amount of heat the ambient air receives from the cooling medium in the heat exchanger 50. As a result, it is possible to secure a sufficient amount of the ambient air entering the duct part 40 even at a low wind speed.

The fan 52 may be provided either one of an upstream side and a downstream side of the heat exchanger 50 in the duct part 40. By arranging the fan 52 on the upstream side of the heat exchanger 50 as shown in FIG. 5 (Forced Drive Type), the fan can protect the heat exchanger from rain, snow and so on to some extent.

Further, a controller which changes a rotation speed or an operating status of the fan 52 may be provided to adjust the amount of heat the ambient air receives from the cooling medium in the heat exchanger 50.

Figure 6:
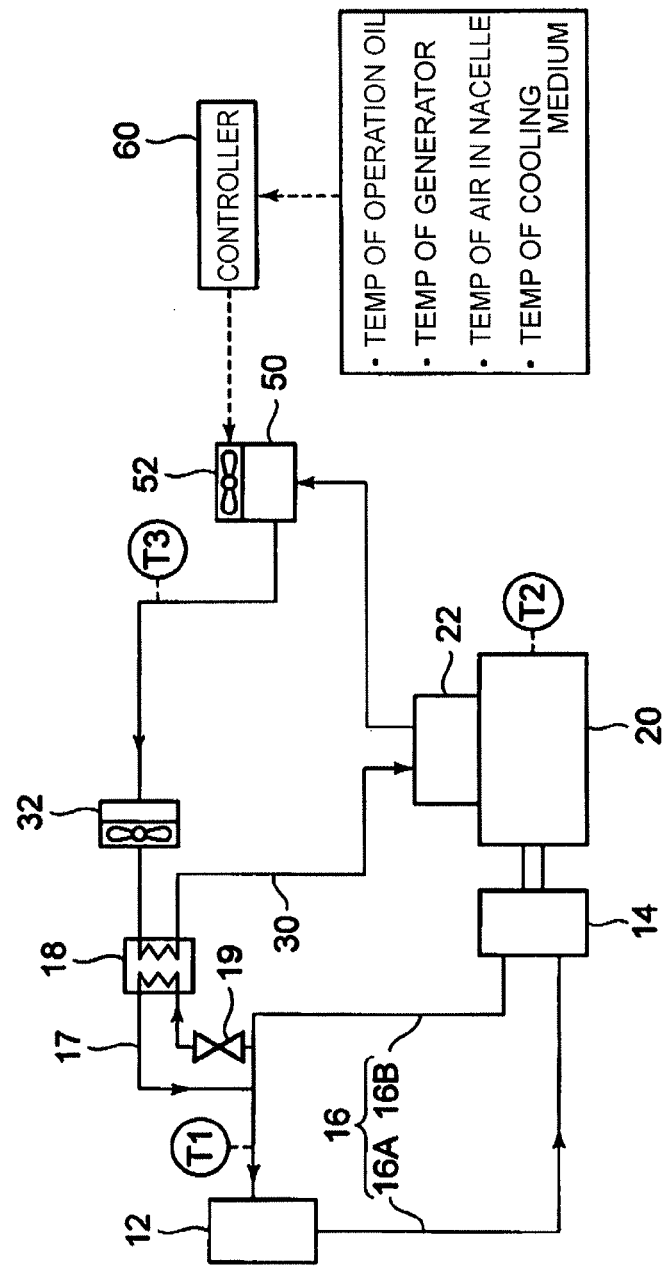
FIG. 6 is a diagram showing how a controller controls a rotation speed of a fan.
Figure 7:
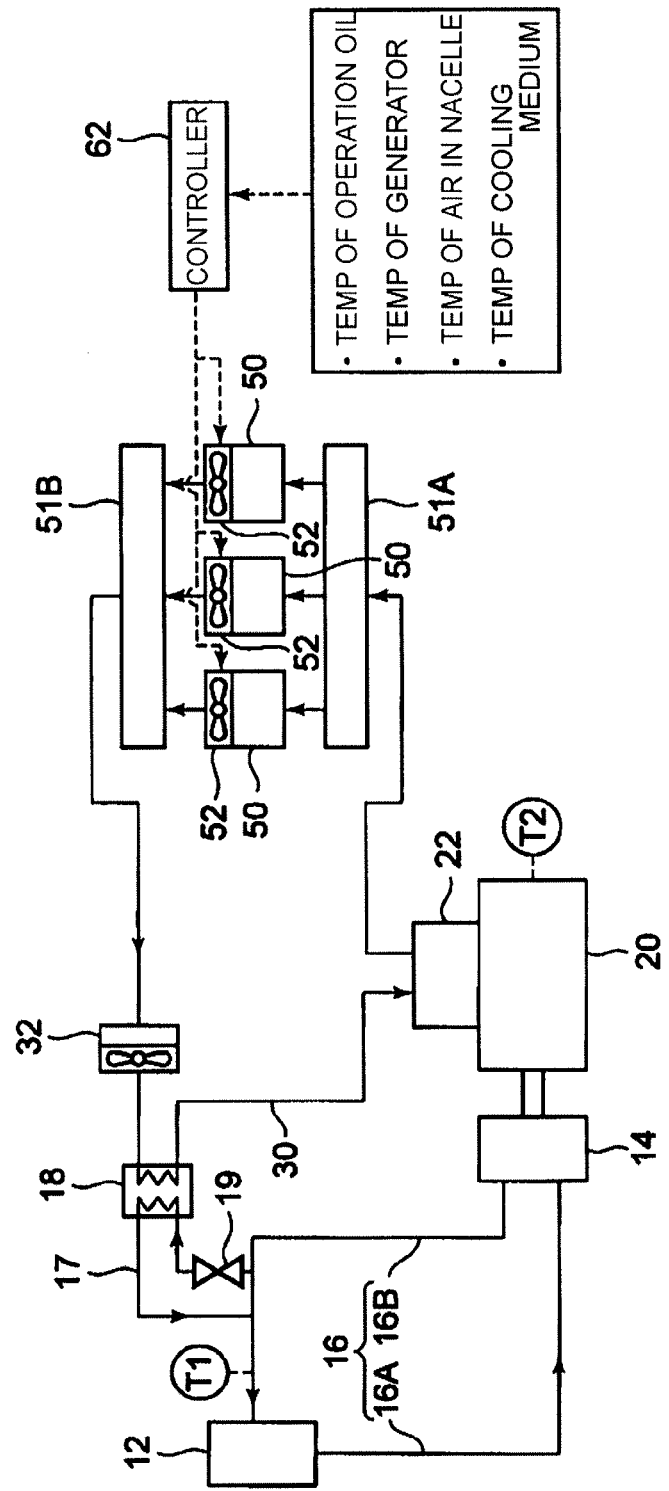
FIG. 7 is a diagram showing how the controller controls an operating status of the fan.

FIG. 6 is a diagram showing how the controller controls the rotation speed of a fan 52. FIG. 7 is a diagram showing how the controller controls the operating status of the fan 52.

As shown in FIG. 6, a controller 60 controls the rotation speed of the fan 52 based on at least one of a temperature of the operating oil in the oil line 16, a temperature of the generator 20, a temperature of the air in the nacelle 4 and a temperature of the cooling medium so as to adjust the heat exchange amount in the heat exchanger 50.

In an example shown in FIG. 6, the temperature of the operating oil is measured by a temperature sensor T1 which is provided in the low-pressure oil line 16B on a downstream side of the parallel line 17, the temperature of the generator 20 being measured by a temperature sensor T2 mounted to the generator 20, the temperature of the cooling medium being measured by a temperature sensor T3 provided in the cooling-medium circulating path 30 on the downstream side of the heat exchanger 50. The temperature of the air in the nacelle 4 is detected by a temperature sensor (not shown) provided in the nacelle 4.

When the measured temperature of the operating oil in the low-pressure oil line 16B becomes not greater than a threshold, the controller 60, for instance, reduces the rotation speed of the fan 52 (including controlling of the rotation speed to zero) so as to prevent supercooling of the operating oil. In conjunction with this, an opening degree of a valve 19 provided in the parallel line 17 may be adjusted to reduce the flow of the operating oil in the oil cooler 18, thereby further preventing the supercooling of the operating oil firmly.

In a similar manner, the controller 60 may adjust the rotation speed of the fan 52 so that a measured temperature such as the temperature of the generator 20 measured by the temperature sensor T2, the temperature of the cooling medium measured by the temperature sensor T3 and the temperature of the air in the nacelle 4 measured by the temperature sensor (not shown) becomes within a desired range.

Alternatively, as shown in FIG. 7, a controller 62 may be provided. The controller 62 changes a number of the fan 52 that is in an operating status based on at least one of the temperature of the operating oil in the oil line 16, the temperature of the generator 20, the temperature of the air in the nacelle 4 and the temperature of the cooling medium.

When the measured temperature of the operating oil in the low-pressure oil line 16B measured by the temperature sensor T1 becomes not greater than a threshold, the controller 62, for instance, reduces the number of the operating fan 52 so as to prevent supercooling of the operating oil. In conjunction with this, the opening degree of the valve 19 provided in the parallel line 17 may be adjusted to reduce the flow of the operating oil in the oil cooler 18, thereby further preventing the supercooling of the operating oil firmly.

In a similar manner, the controller 62 may adjust the number of the operating fan 52 so that a measured temperature such as the temperature of the generator 20 measured by the temperature sensor T2, the temperature of the cooling medium measured by the temperature sensor T3 and the temperature of the air in the nacelle 4 measured by the temperature sensor (not shown) becomes within a desired range.

The wind turbine generator may be assembled with use of a module which is constituted of the heat exchanger 50, the fan and a casing 53 which houses the heat exchanger 50 and the fan 52.

Figure 8:
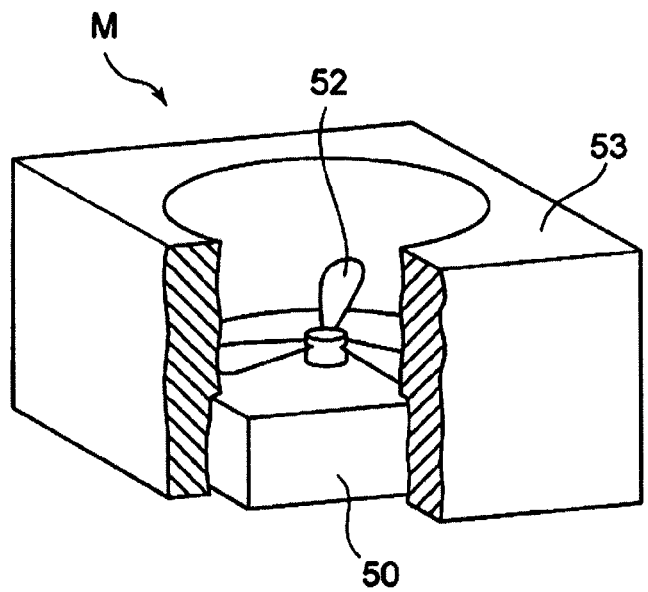
FIG. 8 is a fragmentary sectional view of a module which is constituted of a heat exchanger, a fan and a casing.

FIG. 8 is a fragmentary sectional view of the module constituted of the heat exchanger 50, the fan 52 and the casing 53. FIG. 8 shows a module M constituted of the heat exchanger 50, the fan 52 and the casing supporting both of the heat exchanger 50 and the fan 52. A prescribed number of the modules M are installed in the nacelle 4, thereby improving productivity and maintainability of the wind turbine generator. In other words, it is easier to assemble the wind turbine generator with use of the modules M, thereby improving the productivity. When a part of the heat exchanger 50 and the fan 52 are broken, the part having a failure source is attended by replacing the module M and thus, maintenance is facilitated. Further, by changing the number of the modules M depending on the amount of heat generation from the heat-producing component of the wind turbine generator 1, a variety of wind turbine generators with different amount of heat generation from the heat-producing component can be produced efficiently.

A prescribed number of the modules M may be provided for each duct part 40 (40A, 40B). For instance, one module M may be provided for each duct part 40 (40A, 40B) or a plurality of modules M may be provided for each duct part 40 (40A, 40B).

Third Preferred Embodiment

A wind turbine generator in relation to a third preferred embodiment is explained. The wind turbine generator of the third preferred embodiment has the same structure as the wind turbine generator 1 of the first preferred embodiment except for a shutter additionally provided in the duct part 40 of the nacelle 4. Thus, the components that are already explained in the first preferred embodiment are indicated by the same reference numbers and are not explained further and mainly the structure different from the first preferred embodiment is explained here.

Figure 9:
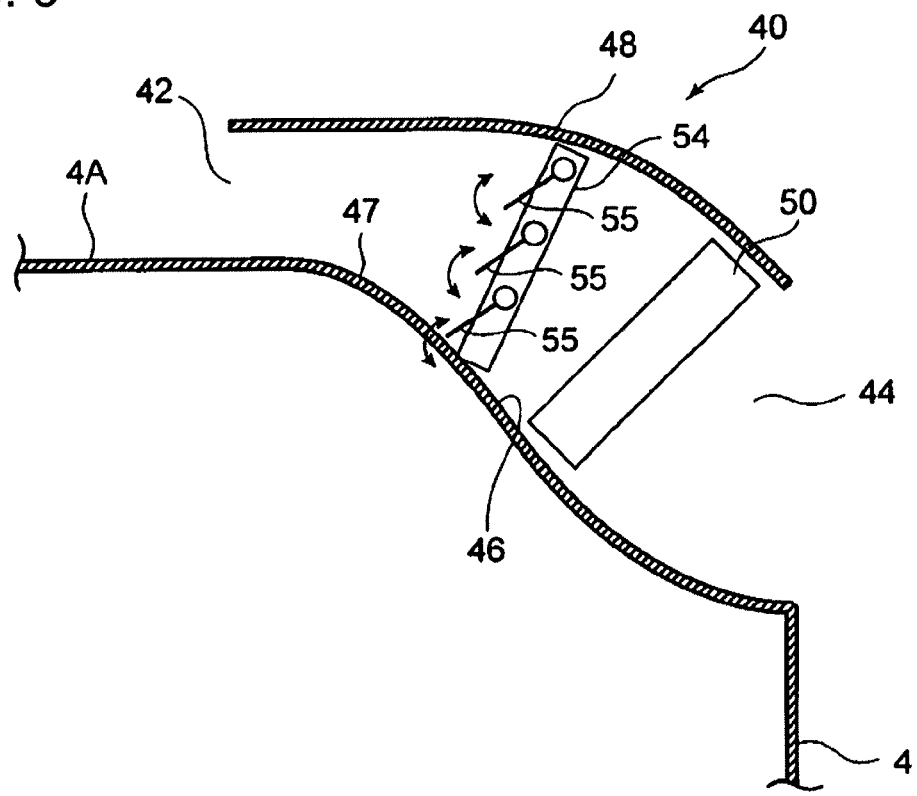
FIG. 9 shows a structure around a duct part of a wind turbine generator in relation to a third preferred embodiment.

FIG. 9 shows a structure around the duct part 40 of the wind turbine generator in relation to the third preferred embodiment. FIG. 9 shows a shutter 54 provided in the duct part 40 of the nacelle 4 in addition to the heat exchanger 50. As shown in FIG. 9, the shutter 54 may be constituted of a plurality of louver panels 55 arranged approximately parallel to one another and a frame supporting the louver panels 55. A variety of dampers having a structure different from the shutter may be used. By opening and closing the shutter 54, the flow of the ambient air in the duct part 40 is shut off or allowed. By this, the amount of heat the ambient air receives from the cooling medium is adjusted in the heat exchanger 50.

The shutter 54 may be provided on the upstream side or the downstream side of the heat exchanger 50 in the duct part 40. By arranging the shutter 54 on the upstream side of the heat exchanger 50 as shown in FIG. 9, the shutter can protect the heat exchanger 50 from rain, snow and so on to some extent.

A controller which controls opening and closing of the shutter 54 may be provided to adjust the amount of heat the ambient air receives from the cooling medium in the heat exchanger 50.

Figure 10:
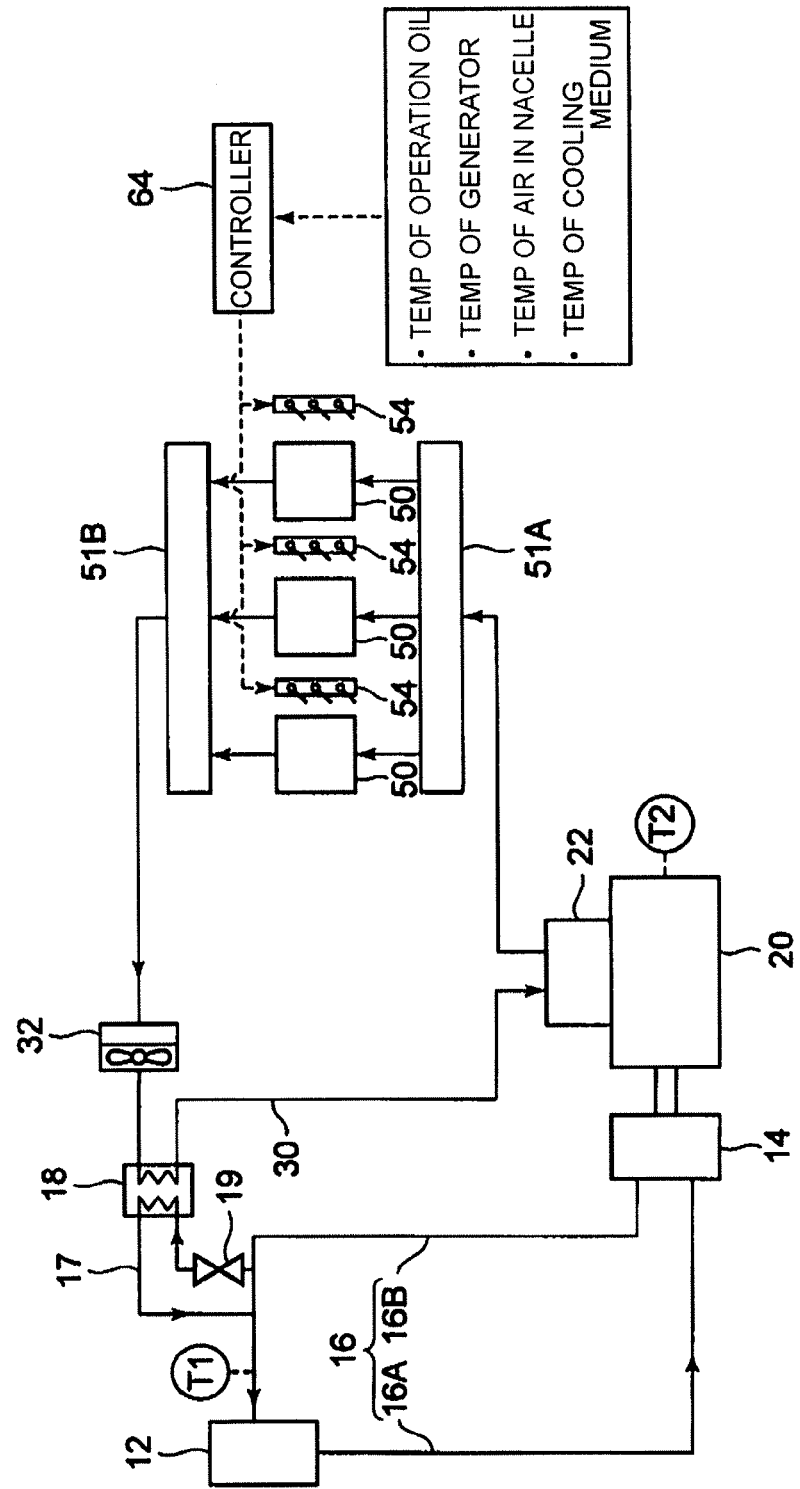
FIG. 10 is a diagram showing how the controller controls opening and closing of a shutter.

FIG. 10 is a diagram showing how the controller controls opening and closing of the shutter 54. As show in the drawing, the controller 64 controls the opening and closing of each shutter 54 individually based on at least one of the temperature of the operating oil in the oil line 16, the temperature of the generator 20, the temperature of the air in the nacelle 4 and the temperature of the cooling medium, so as to adjust the heat exchange amount in the heat exchanger 50.

For instance, when the measured temperature of the operating oil in the low-pressure oil line 16B measured by the temperature sensor T1 becomes not greater than the threshold, the controller 60 increases the number of a closed shutter 54 so as to prevent supercooling of the operating oil. In conjunction with this, the opening degree of a valve 19 provided in the parallel line 17 may be adjusted to reduce the flow of the operating oil in the oil cooler 18, thereby further preventing the supercooling of the operating oil firmly.

In a similar manner, the controller 64 may control the opening and closing of the shutter 54 so that the measured temperature such as the temperature of the generator 20 measured by the temperature sensor T2, the temperature of the cooling medium measured by the temperature sensor T3 and the temperature of the air in the nacelle 4 measured by the temperature sensor (not shown) becomes within a desired range.

The controller 64 controls the opening of each shutter 54 to perform fine adjustment of the heat exchange amount in the heat exchanger 50.

Fourth Preferred Embodiment

A wind turbine generator in relation to a fourth preferred embodiment is explained. The wind turbine generator of the third preferred embodiment has the same structure as the wind turbine generator 1 of the first preferred embodiment except for a shape of the top surface 48 of the duct part 40. Thus, the components that are already explained in the first preferred embodiment are indicated by the same reference numbers and are not explained further and mainly the structure different from the first preferred embodiment is explained here.

Figure 11:
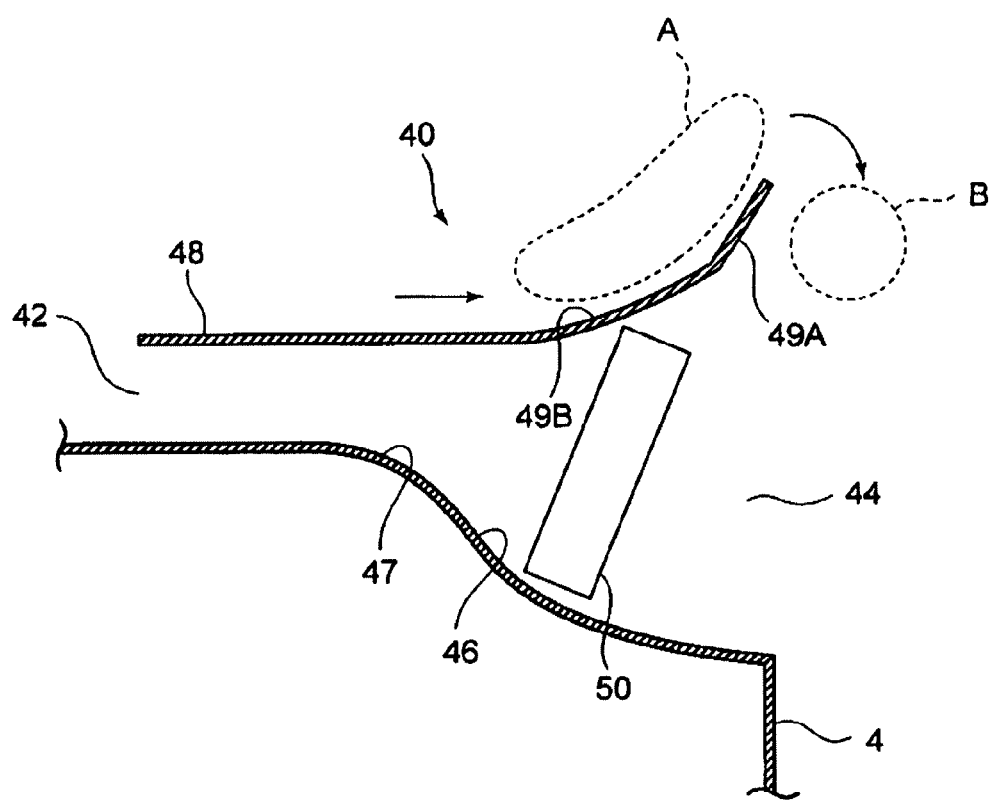
FIG. 11 shows a structure around a duct part of a wind turbine generator in relation to a fourth preferred embodiment.

FIG. 11 shows a structure around the duct part 40 of a wind turbine generator in relation to the fourth preferred embodiment. As shown in the drawing, the inner wall 46 of the nacelle 4 constituting the bottom surface of the duct part 40 curves inward. The outer wall 48 of the nacelle 4 constituting the top surface of the duct part 40 has a flange portion 49A at an end thereof on the side of the intake port 44. The flange portion 49A of the outer wall 48 bends outward in a direction away from the center line of the nacelle 4. The outer wall 48 of the nacelle 4 also has a curved portion 49B on an upstream side of the flange portion 49A. The curved portion 49B of the outer wall 48 curves outward in the direction away from the center line of the nacelle 4. The curved portion 49B and the flange portion 49A are discontinuously connected. The outer wall 48 curves smoothly to the curved portion 49B and bends abruptly to the linear flange portion 49A bending outward linearly.

The flow of the air outside the duct part 40 is indicated with arrows in the drawing. The air flows along the outer wall 48 of the nacelle.

With reduced flow passage area in an area A near the flange portion 49A and the curved portion 49B, the air increases the speed, raising the dynamic pressure. For the corresponding amount, the static pressure decreases. Therefore, the pressure (static pressure) decreases in an area B on a downstream side of the flange portion 49A. This generates a vortex in the area B on the downstream side of the flange portion 49A. This also contributes to the pressure drop in the area B. Therefore, in addition to the diffuser effect due to the increased cross-sectional area of the duct part 40 mentioned above, it is possible to draw in a larger amount of the ambient air at a low pressure from the intake port 42 to the duct part 40 in the area B on the downstream side of the flange portion 49A. The amount of heat the ambient air receives from the cooling medium in the heat exchanger 50 increases and thus, the cooling of the heat-producing component of the wind turbine generator 1 can be performed effectively.

FIG. 11 shows the example where the outer wall 48 of the nacelle 4 is formed with both the flange portion 49A and the curved portion 49B. However, this is not limitative, and the outer wall 48 may be formed with one of the flange portion 49A and the curved portion 49B, still achieving the same effect.

While the present invention has been described with reference to exemplary embodiments, it is obvious to those skilled in the art that the first through fourth preferred embodiments may be combined as desired and various changes may be made without departing from the scope of the invention.

For instance, the shutter 54 of the third preferred embodiment may be additionally provided inside the duct part 40 of the wind turbine generator in relation to the second preferred embodiment (see FIG. 5). Specifically, both the fan 52 and the shutter 54 may be provided in the duct part 40. Alternatively, one or both of the fan 52 of the second preferred embodiment and the shutter 54 of the third preferred embodiment may be provided in the duct part 40 of the wind turbine generator in relation to the fourth preferred embodiment (see FIG. 11).

| [Reference Signs list] | |
| --- | --- |
| 1 | Wind turbine generator |
| 2 | Tower |
| 4 | Nacelle |
| 5 | Main shaft |
| 6 | Rotor |
| 6A | Blade |
| 6B | Hub |
| 10 | Hydraulic transmission |
| 12 | Hydraulic pump |
| 14 | Hydraulic motor |
| 16 | Oil line |
| 16A | High-pressure oil line |
| 16B | Low-pressure oil line |
| 17 | Parallel line |
| 18 | Oil cooler |
| 19 | Valve |
| 20 | Generator |
| 22 | Generator cooler |
| 30 | Cooling-medium circulating path |
| 32 | Nacelle cooler |
| 40 | Duct part |
| 42 | Intake port |
| 44 | Exhaust port |
| 46 | Inner wall of the nacelle (bottom surface of the duct part) |
| 47 | Curved portion |
| 48 | Outer wall of the nacelle (a top surface of the duct part) |
| 49A | Flange portion |
| 49B | Curved portion |
| 50 | Heat exchanger |
| 52 | Fan |
| 54 | Shutter |

The invention claimed is:

1. A wind turbine generator comprising:
a tower;
at least one blade;
a hub which supports the at least one blade;
a main shaft connected to the hub;
a nacelle which is supported by the tower and has a duct part having an intake port and an exhaust port, the duct part being integrally-formed on a wall of the nacelle; and
a heat exchanger which is provided in the duct part and cools a cooling medium having cooled a heat-producing component inside at least one of the tower and the nacelle by heat exchange with an ambient air introduced into the duct part through the intake port,
wherein the nacelle includes a nacelle interior which is formed with a space inside the nacelle surrounded with a top surface, side surfaces, and a bottom surface of the nacelle,
wherein, in an area where the duct part is provided, the wall of the nacelle has a double wall structure constituted of:
an inner wall at least partially demarcating the nacelle interior from an outside of the nacelle interior, and
an outer wall arranged outside the nacelle interior to cover at least a portion of an outer surface of the inner wall,
wherein the inner wall of the nacelle forms a bottom surface of the duct part and has a curved portion which curves inward toward a center line of the nacelle with increasing distance from the hub, and
wherein the duct part increases in cross-section from a side of the intake port to a side of the exhaust port at least in an area where the curved portion is formed.

2. The wind turbine generator according to claim 1, wherein more than one of the heat exchanger is provided in the duct part which is integrally formed on the top surface and a side surface of the nacelle.

3. The wind turbine generator according to claim 1, wherein an end of the duct part which is on the side of the intake port is formed along the center line of the nacelle.

4. The wind turbine generator according to claim 1, wherein the outer wall of the nacelle constitutes a top surface of the duct part and has a curved portion which curves along the bottom surface of the duct part.

5. The wind turbine generator according to claim 4, wherein a distance between the bottom surface and the top surface of the duct part is smaller than an opening width of the exhaust port.

6. The wind turbine generator according to claim 1, further comprising:
a hydraulic pump which is driven by the main shaft;
a hydraulic motor which is driven by operating oil of high pressure that is supplied from the hydraulic pump;
a generator which is connected to the hydraulic motor;
an oil line which is connected to the hydraulic pump and the hydraulic motor to circulate the operating oil between the hydraulic pump and the hydraulic motor;
an oil cooler which cools the operating oil flowing in the oil line; and
a generator cooler which cools the generator,
wherein the cooling medium having been cooled in the heat exchanger is supplied to the oil cooler and the generator cooler.

7. The wind turbine generator according to claim 1, wherein the cooling medium is one of water to which antifreeze fluid is added and air.

8. A wind turbine generator comprising:
a tower;
at least one blade;
a hub which supports the at least one blade;
a nacelle which is supported by the tower and has a duct part having an intake port and an exhaust port, the duct part being integrally-formed on a wall of the nacelle; and
a heat exchanger which is provided in the duct part and cools a cooling medium having cooled a heat-producing component inside at least one of the tower and the nacelle by heat exchange with an ambient air introduced into the duct part through the intake port, wherein the wall of the nacelle has a double wall structure constituted of an inner wall and an outer wall in an area where the duct part is provided, wherein the inner wall of the nacelle forms a bottom surface of the duct part and has a curved portion which curves inward toward a center line of the nacelle with increasing distance from the hub, and wherein the duct part increases in cross-section from a side of the intake port to a side of the exhaust port at least in an area where the curved portion is formed, the wind turbine generator further comprising:

a fan which allows a larger amount of the ambient air to enter the duct part; and a casing which houses both of the fan and the heat exchanger, wherein more than one module comprising the heat exchanger, the fan and the casing is provided.

9. The wind turbine generator according to claim 8, wherein said more than one module is provided in the duct part which is integrally formed on a top surface and a side surface of the nacelle.

10. The wind turbine generator according to claim 8, further comprising:

a controller which changes a number of the fans in an operating status to adjust an amount of heat the ambient air receives from the cooling medium in the heat exchanger of each of the modules.

11. The wind turbine generator according to claim 8, further comprising:

a shutter which is provided in the duct part; and a controller which controls opening and closing of the shutter to adjust an amount of heat the ambient air receives from the cooling medium in the heat exchanger of each of the modules.

12. The wind turbine generator according to claim 8, further comprising:

a controller which changes a rotation speed of the fan to adjust an amount of heat the ambient air receives from the cooling medium in the heat exchanger of each of the modules.

13. A wind turbine generator comprising:

a tower;

at least one blade;

a hub which supports the at least one blade;

a nacelle which is supported by the tower and has a duct part having an intake port and an exhaust port, the duct part being integrally-formed on a wall of the nacelle; and a heat exchanger which is provided in the duct part and cools a cooling medium having cooled a heat-producing component inside at least one of the tower and the nacelle by heat exchange with an ambient air introduced into the duct part through the intake port, wherein the wall of the nacelle has a double wall structure constituted of an inner wall and an outer wall in an area where the duct part is provided, wherein the inner wall of the nacelle forms a bottom surface of the duct part and has a curved portion which curves inward toward a center line of the nacelle with increasing distance from the hub, and wherein the duct part increases in cross-section from a side of the intake port to a side of the exhaust port at least in an area where the curved portion is formed, the wind turbine generator further comprising:

a nacelle cooler which is provided in the nacelle and cools an air in the nacelle, wherein the cooling medium having been cooled in the heat exchanger is supplied to the nacelle cooler.

14. The wind turbine generator according to claim 13, further comprising:

a main shaft which is coupled to the hub;

a hydraulic pump which is driven by the main shaft;

a hydraulic motor which is driven by operating oil of high pressure that is supplied from the hydraulic pump;

a generator which is connected to the hydraulic motor;

an oil line which is connected to the hydraulic pump and the hydraulic motor to circulate the operating oil between the hydraulic pump and the hydraulic motor;

an oil cooler which cools the operating oil flowing in the oil line;

a generator cooler which cools the generator; and a controller which adjusts a heat exchange amount in at least one of the oil cooler, the generator cooler, the nacelle cooler and the heat exchanger based on at least one of a temperature of the operating oil in the oil line, a temperature of the generator, a temperature of the air in the nacelle and a temperature of the cooling medium, wherein the cooling medium having been cooled in the heat exchanger is supplied to the oil cooler and the generator cooler.

15. The wind turbine generator according to claim 13, further comprising:

a main shaft which is coupled to the hub;

a hydraulic pump which is driven by the main shaft;

a hydraulic motor which is driven by operating oil of high pressure that is supplied from the hydraulic pump;

a generator which is connected to the hydraulic motor;

an oil line which is connected to the hydraulic pump and the hydraulic motor to circulate the operating oil between the hydraulic pump and the hydraulic motor;

an oil cooler which cools the operating oil flowing in the oil line;

a generator cooler which cools the generator, a fan which allows a larger amount of the ambient air to enter the duct part;

a casing which houses both of the fan and the heat exchanger; and a controller which controls the fan and the heat exchanger of each of modules based on at least one of a temperature of the operating oil in the oil line, a temperature of the generator, a temperature of the air in the nacelle and a temperature of the cooling medium, said each of the modules comprising the casing, the heat exchanger and the fan, wherein the cooling medium having been cooled in the heat exchanger is supplied to the oil cooler and the generator cooler.

16. A wind turbine generator comprising:

a tower;

at least one blade;

a hub which supports the at least one blade;

a nacelle which is supported by the tower and has a duct part having an intake port and an exhaust port, the duct part being integrally-formed on a wall of the nacelle; and a heat exchanger which is provided in the duct part and cools a cooling medium having cooled a heat-producing component inside at least one of the tower and the nacelle by heat exchange with an ambient air introduced into the duct part through the intake port, wherein the wall of the nacelle has a double wall structure constituted of an inner wall and an outer wall in an area where the duct part is provided, wherein the inner wall of the nacelle forms a bottom surface of the duct part and has a curved portion which curves inward toward a center line of the nacelle with increasing distance from the hub, wherein the duct part increases in cross-section from a side of the intake port to a side of the exhaust port at least in an area where the curved portion is formed, and wherein the outer wall of the nacelle constitutes a top surface of the duct part and bends or curves outward in a direction away from the center line of the nacelle.

* * * * *